May 12, 1942.  F. W. WHITLOCK  2,282,442
SYSTEM FOR MEASUREMENT AND CONTROL
Filed April 7, 1938  3 Sheets-Sheet 1

Fig. 1

Inventor:
Fred W. Whitlock
By Karl H. Sommermeyer
Atty.

May 12, 1942.　　　F. W. WHITLOCK　　　2,282,442

SYSTEM FOR MEASUREMENT AND CONTROL

Filed April 7, 1938　　　3 Sheets-Sheet 3

Inventor:
Fred W. Whitlock
By Karl H. Sommermeyer
Atty.

Patented May 12, 1942

2,282,442

UNITED STATES PATENT OFFICE 2,282,442

SYSTEM FOR MEASUREMENT AND CONTROL

Fred W. Whitlock, Freeport, Ill., assignor to Micro Switch Corporation, Freeport, Ill., a corporation of Illinois Application April 7, 1938, Serial No. 200,810

14 Claims. (Cl. 236—78)

The present invention relates generally to temperature control systems for buildings.

It constitutes an improvement upon the heating control systems described and claimed in the copending application of Edwin De Witt Coleman, Serial No. 738,613 filed August 6, 1934, now Patent 2,144,105, January 17, 1939, and in my copending application Serial No. 189,545, filed February 9, 1938. The Coleman system employs a system of Wheatstone bridge circuits for first measuring room temperature and controlling the rate of heat input to the room so as to tend to maintain that temperature constant and for secondly subjecting the rate of heat input to maximum and minimum limits which are determined chiefly by the outdoor temperature. In the Coleman system the measurement of the outdoor temperature and the determination of the rate of heat therefrom are accomplished by a single measurement of a condition dependent upon both the outdoor temperature and the rate at which heat is delivered to the room. For example a limit bridge circuit measures a weighted average of outdoor temperature and the temperature of some part of the heating system.

And in the systems shown in my aforementioned copending applications the measurements of room temperature are modified by other measurements. For example the measurement of the room temperature may be modified by a measurement of heating system temperature or of the operated position of a valve to provide a rebalancing type of control. Further, the measurement of room temperature may be modified also by a measurement of outdoor temperature to prevent the rebalancing arrangement from depressing the control point. It is desirable to provide an improved circuit for taking measurements dependent on a plurality of individual temperatures, or the like. It is desirable also that the relative weighting of any two component values entering into a particular measurement be adjustable, so that their relative effects may be regulated. Such adjustments may be termed "slope adjustments" since the relative effectivenesses of any two temperatures entering into a single measurement may be defined interms of the slope of the curve representing the relation between those two temperatures. The positions of such curves are most conveniently defined in terms of their intercepts with axes having peculiar significance in the theory or design of the system, or with axes relating to a condition of operation that is easily determined without the aid of measurements by the control system itself. Accordingly the adjustments and operation of the system are conveniently defined and described in terms of the slopes of these various performance curves and their intercepts with the axis of normal room temperature or condition of zero heat input. Because these particular intercepts serve as the most convenient reference for the adjustment, design and calibration of any particular system it is desirable that these particular intercepts be adjustable entirely independently of each other, and of all other adjustments, and that no adjustment once made be disturbed by the making of any other adjustments.

Frequently it is desirable to control according to a number of different independent measurements each of which depends at least in part upon the same temperature. Thus for example a system employing a primary room control and a secondary rate of heat limit control may require that each of two limit measurements and the room temperature measurement all be modified by or depend upon the outdoor temperature. It is undesirable to duplicate the outdoor thermometer or to transfer the outdoor thermometer from one temperature measuring bridge circuit to another because the resistance of electric contacts may vary from time to time by values large enough compared to the resistance changes of the thermometer itself, that contact resistance introduced directly in circuit with the temperature measuring element seriously interferes with the measurement of the temperature values.

Objects of the present invention include the provision of a new and improved system of electric measuring circuits of the bridge type, the provision of an improved circuit for taking measurements dependent upon a number of independently measurable conditions, and the provision of a system of temperature measuring electrical bridge circuits wherein a number of individual temperature measuring elements and the like may be combined in various ways for permitting a variety of individual control functions, wherein the relative effectivenesses of such individual elements may be separately adjusted for each individual measurement and wherein the adjustments for each individual measurement are entirely independent of adjustments provided for other measurements. Other objects include the provision of an electric bridge type of measuring and control system wherein duplicate measuring elements are avoided without requiring that the measuring elements be switched into and out of their respective electric circuits, and the provision of a system of the type indicated wherein the necessary switching is so arranged in the circuit, and wherein the circuit is so designed with respect to the operation of switches, that occasional irregularities in contact resistance values will not seriously disturb the operation of the system. Still other objects include the provision of a new and improved system for combining the effects of separate temperature responsive elements or the like in a single measurement, and the provision of an improved and simplified temperature control system. These and other objects and advantages of the present invention will become apparent from the following description of certain specific embodiments of the invention, which embodiments serve by way of example to illustrate the manner in which the invention may be put into practice without thereby limiting the invention to the details of any particular illustration or example. In the drawings:

In accordance with one manner of carrying out my present invention I connect the measuring elements or resistance thermometers for each separate temperature measurement in a separate main bridge branch across the terminals of the power supply, connect a coupling branch containing resistors or a potentiometer, between center points of two separate main bridge branches, and make the galvanometer connection, not in the usual manner to a midpoint of a main bridge branch itself but rather to a point on the coupling resistor or potentiometer of the coupling branch. Movement of the galvanometer connection along this coupling branch serves to alter the relative effects of the two separate bridge branches upon the potential of the galvanometer connection. Furthermore where two or more independent measurements are to be made involving the same bridge branch, separate coupling resistors or potentiometers are connected to the various bridge branches and switches are interposed in the coupling branches so that the circuits may be completed through only the particular coupling resistors involved in the particular measurement being made. I provide no switches whatsoever in the main bridge branches, but place all switches in the coupling branches, and give each coupling branch a total resistance that is high compared to the probable variation of its switch resistance. Furthermore, I so locate the contacts in the coupling branch that their occasional failure to operate will simply prevent the system from exercising its usual control function rather than cause the system to control improperly, or alternatively, I so locate the switch contacts that their failure will leave the galvanometer connected to that one of the two main bridge branches which generally is required to exert the greater effect upon the galvanometer.

Figure 1:
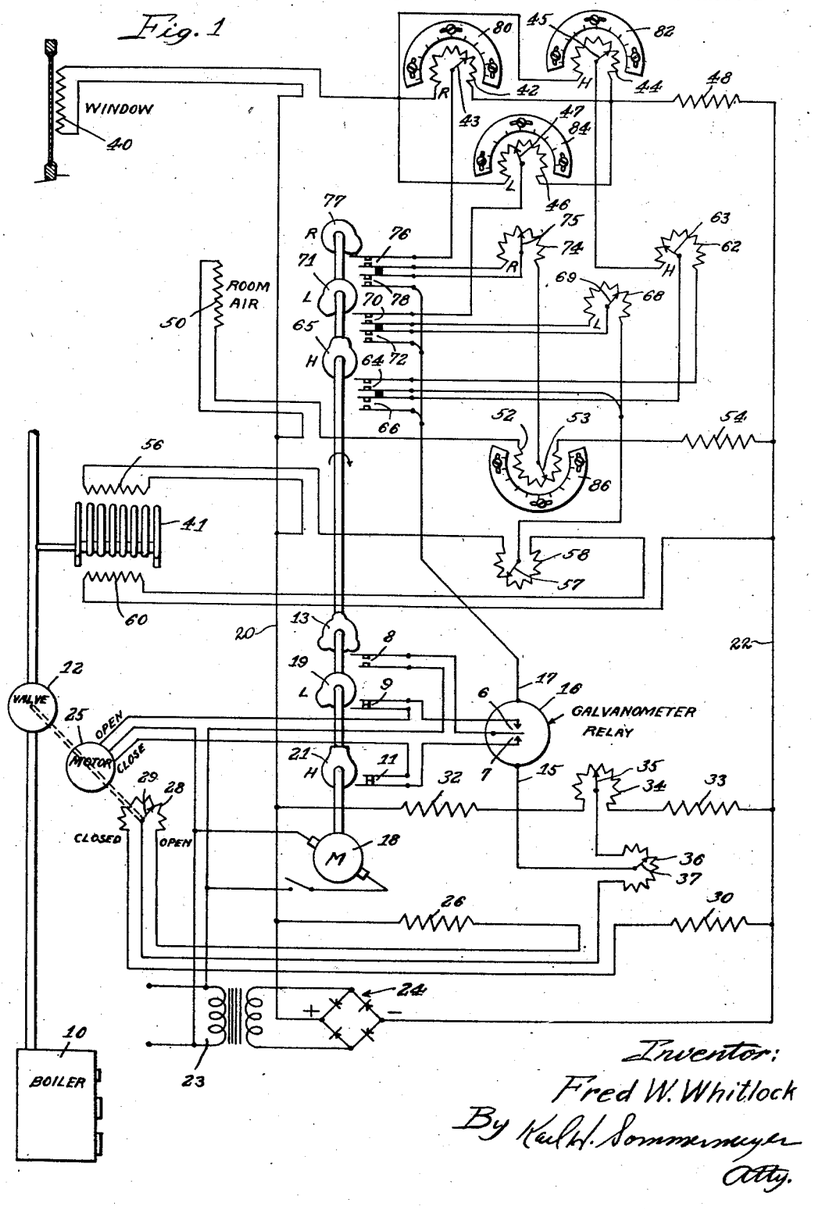
Fig. 1 is a partially schematic diagram of a temperature control system embodying my present invention.

In Fig. 1 a boiler 10 supplies steam under control of a motor operated valve 12 to the heating system of a building (not shown completely) which system includes a steam radiator 14. The operation of the valve 12 is controlled by a galvanometer or galvanometer relay 16 included in a system of temperature measuring Wheatstone bridge circuits now to be described. In all, three different bridge arrangements control the galvanometer relay 16 at different times. These three different bridge arrangements are separate and distinct from each other but are composed of a number of common measuring elements. A group of cam operated switches driven by a motor 18 operate to complete each bridge arrangement separately and to connect the galvanometer to it.

All of the various pairs of bridge arms or main bridge branches are connected across terminals 20 and 22 of a direct current power supply represented generally by the reference numeral 24. One main bridge branch, or pair of bridge arms, includes a fixed resistor 26, a potentiometer 28 operated in unison with the motor operated valve 12, and a second fixed resistor 30. A second main branch includes fixed resistor 32, a centering potentiometer 34, and a second fixed resistor 33. A coupling potentiometer 36 is connected between the center tap 35 of the centering potentiometer 34 and the center tap 29 of the valve potentiometer 28, and the center tap 37 of the coupling potentiometer 36 is connected to one terminal 15 of the galvanometer 16. The valve potentiometer 28 serves to rebalance the bridge circuit in response to each operation of the valve 12, and the magnitude of the rebalancing effect is determined by the setting of the valve coupling potentiometer 36.

A third pair of bridge arms (shown at the top of the diagram) includes a temperature sensitive resistor or window thermometer 40, a group of three potentiometers 42, 44 and 46 connected in parallel with each other, and a fixed resistor 48. The window thermometer 40 is mounted in good thermal engagement with the inside surface of a window glass to provide an index of outdoor temperature. A fourth pair of bridge arms includes a temperature sensitive resistor or room thermometer 50, a centering potentiometer 52, and a fixed resistor 54. The room thermometer 50 is located in the room at a position remote from the radiators, as for example on an inside wall, and so gives to the control system a measure or index of room air temperature. A fifth bridge branch includes a resistance thermometer 56 located above the radiator 14, a centering potentiometer 58, and a resistance thermometer 60 located below the radiator 14. The two radiator thermometers 56 and 60 are placed in the air flowing across the radiator. Together they give to the bridge system a measure of the temperature rise of air across the radiator and therefore give it an index of the rate of heat input to the rooms.

Connected between the center tap 45 of potentiometer 44 and a center tap 57 of the centering potentiometer 58 is a coupling potentiometer 62 and switch contacts 64 operated by the cam 65, the switch contacts being next to center tap 57 of potentiometer 58. The center tap 63 of the coupling potentiometer 62 is connected by switch contacts 66 to the terminal 17 of the galvanometer 16. When the switch contacts 64 and 66 are closed by cam 65, the galvanometer tests to determine whether or not the heat input to the room is above or below predetermined maximum value or high limit, which value depends upon the outdoor temperature as measured by the window thermometer 40 at the time of the test. The manner in which the system operates to make this test will be explained presently. Similarly there is connected between the center tap 47 of the potentiometer 46 and the center tap 57 of potentiometer 58, switch contacts 70 and a coupling potentiometer 68 with the switch contacts 70 next to the potentiometer 44. The center tap 69 of potentiometer 68 is connected through switch contact 72 to the galvanometer 16. When the switches 70 and 72 are closed by cam 71 the galvanometer 16 test to determine whether or not the rate of heat input is above or below the value set as the low limit of heat input.

The potentiometers 42 and 52 may be connected mechanically so that they are constrained to operate together. Their center taps 43 and 53 have connected between them a coupling potentiometer 74 and switch contacts 76, with switch 76 next to the potentiometer 42. The center tap 75 of potentiometer 74 is connected through switch contact 78 to the galvanometer 16 and when the contacts 76 and 78 are closed by cam 77 the galvanometer 16 responds to a measurement of room temperature by the thermometer 50. This measurement of room temperature is made to depend in part upon the window thermometer 40 so that the rebalancing function of the valve potentiometer 28 need not cause the control point of the room temperature to drop as the rate of heating increases in response to a drop of outdoor temperature.

The galvanometer relay 16 is shown diagrammatically as having a pair of contacts 6 and 7 adapted to be closed by the galvanometer when it responds to unbalanced conditions of the bridge circuits. These contacts 6 and 7 are connected to a power supply 23 and a reversible motor 25 through contacts 8, 9 and 11, operated by cams 13, 19 and 21 which in turn are driven by the same motor 18 that operates cams 65, 71 and 77.

The galvanometer relay 16, which is shown diagrammatically, and the means by which it controls the motor 25 of the valve 12 may be of a type shown in the Coleman Patent No. 2,144,105 already referred to, or in my copending application Serial No. 200,811 filed April 7, 1938.

The motor 18 turns in a clockwise direction to drive the cams at a slow rate, as for example at a speed of one revolution per minute, in a clockwise direction as viewed in Fig. 1. As the motor 18 rotates in a clockwise direction, the cams 77, 65 and 71 so operate their respective contacts that the galvanometer in turn measures the room temperature, tests for the high limit of heat input, and tests for the low limit of heat input. Each time that the galvanometer is connected for one of these tests the cam 13 closes the contact 8 to connect the galvanometer relay 16 to the power supply 23. Cams 19 and 21 and their switches 9 and 11 serve to prevent an opening operation of the valve in response to the low limit test and to prevent a closing operation of the valve in response to a high limit test.

The potentiometers 42, 44, 46 and 52 are provided with graduated scales 80, 82, 84 and 86 whose mounting positions may be adjusted to calibrate them. The graduations of these scales are spaced to correspond to the sensitivities of the resistance thermometers with which they are directly associated. Thus if, for example, room thermometer 50 changes its resistance one ohm per degree of temperature change, the graduations of scale 86 of potentiometer 52 are spaced to allot one ohm of potentiometer 52 to each degree of temperature as graduated on scale 86. The coupling potentiometers 62, 68, 74 and 36 are also graduated but are not equipped with adjustable scales.

Figure 2:
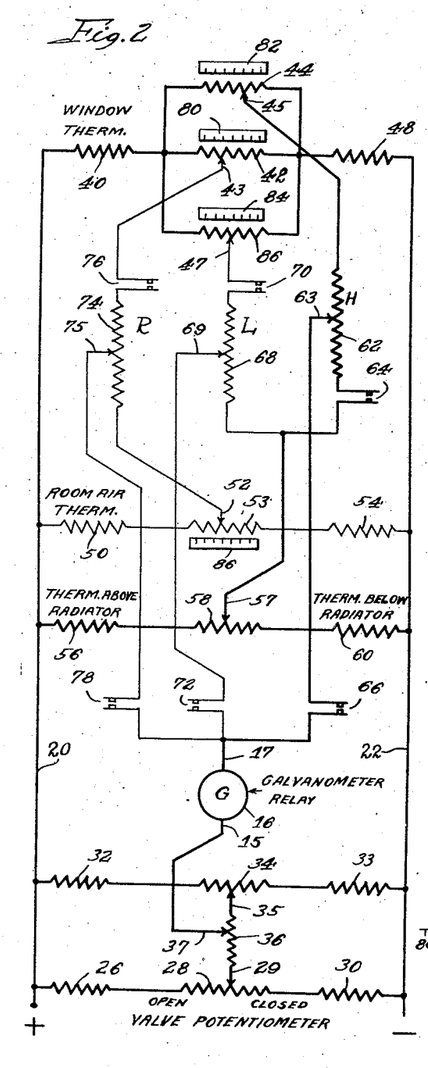
Fig. 2 is a somewhat simplified and conventionalized diagram of the electrical circuits of the system of Fig. 1 for the purpose of facilitating the explanation and description of the apparatus.

The following description of the adjustment and operation of the system may best be understood by reference to Fig. 2 which shows the bridge circuits of Fig. 1 in a somewhat simpler form altho the description applies also to Fig. 1. Corresponding parts are indicated by the same reference numerals in the two figures.

After installation the system is initially adjusted as follows: First the steam valve 12 is moved to its completely closed position to bring the valve potentiometer 28 to that setting which corresponds to zero heat input to the room or space to be heated. The two radiator thermometers 56 and 60 are brought to the same temperature, as for example by laying them next to each other. Preferably they should be at a temperature near 70° F. but the exact temperature is unimportant. The room thermometer 50 and the window thermometer 40 should also be at temperatures near 70° F. but their exact temperatures should be measured, as for example by means of liquid thermometers. Motor 18 is permitted to operate until it has rotated the cams 180° from the position in which they are shown in Fig. 1 so that cam 65 closes contacts 64 and 66.

Next the center taps of the potentiometers 44, 58 and 34 must be adjusted to the same potential as the center tap 29 of the valve potentiometer 28. One procedure for making this adjustment is as follows: The center tap 37 of potentiometer 36 is moved to its lowermost position as seen in Fig. 2 (extreme clockwise position as seen in Fig. 1) so that the potential of center tap 37 and of terminal 15 of galvanometer 16 is determined principally by the setting of valve potentiometer 28 and only slightly by the setting of potentiometer 34. Similarly center tap 63 of potentiometer 62 is moved to its lowermost position as seen in Fig. 2 (extreme clockwise position as seen in Fig. 1) so that the potential of center tap 63 and of terminal 17 of galvanometer 16 is determined principally by the setting of potentiometer 58 and only slightly by the setting of potentiometer 44.

Potentiometer 58 is adjusted to bring the reading of galvanometer 16 to zero. Then the center tap 63 of coupling potentiometer 62 is moved to its uppermost position as seen in Fig. 2 (extreme counter-clockwise position as seen in Fig. 1) so that its potential is determined principally by the setting of potentiometer 44, and potentiometer 44 is adjusted to bring the reading of galvanometer 16 to zero. These two adjustments of potentiometers 58 and 44 are only preliminary adjustments that serve to set their center taps 45 and 57 at approximately the potential of center tap 29 of valve potentiometer 28.

Next center tap 37 of coupling potentiometer 36 is moved to its uppermost position as seen in Fig. 2 and potentiometer 34 is adjusted to again bring the reading of galvanometer 16 to zero. This adjustment has brought center tap 35 of potentiometer 34 to approximately the potential of center tap 29 of valve potentiometer 28, but if center tap 37 of coupling potentiometer 36 is again moved to its lowermost position as viewed in Fig. 2 the galvanometer 16 may deflect out of its zero position. Individual adjustments of potentiometers 44, 50 and 34 should be repeated in turn in the manner just described until the coupling potentiometers 36 and 62 may be manipulated throughout the entire ranges of their adjustments without causing galvanometer 16 to deflect out of its zero position. When this adjustment is completed the center taps of potentiometers 44, 58, 34 and 28 all are at the same potential, and at the potential corresponding to zero rate of heat input to the space to be heated. Next the graduated scale 82 of potentiometer 44 is adjusted to that position in which the center tap 45 indicates the exact temperature of window thermometer 40 on the graduations of the scale.

Next the motor 18 is operated until the cam 71 closes the switches 70 and 72. Then the potentiometer 46 is adjusted to bring the reading of the galvanometer 16 to zero. Inasmuch as potentiometers 58 and 34 already have been brought to their correct adjustments no further adjustments of those potentiometers are required in connection with the setting of potentiometer 46. The adjustable scale 48 of potentiometer 46 is set so that center tap 47 indicates the exact temperature of window thermometer 40.

Next the motor 18 is operated until cam 77 closes switches 76 and 78 to complete the connections to the room coupling potentiometer 74. Then the two potentiometers 42 and 52 are adjusted until the galvanometer 16 reads zero and so that the setting of the coupling potentiometer 74 may be changed without altering the zero reading of the galvanometer. Repeated adjustments of the two potentiometers 42 and 52 may be required. Then the calibrated scale 88 of potentiometer 42 is set so that the center tap 43 indicates on the graduated scale 88 the exact temperature of window thermometer 40 and the graduated scale 86 of the potentiometer 52 is adjusted so that the center tap 53 indicates on the scale 86 the exact temperature of room thermometer 50. If potentiometers 42 and 52 are connected mechanically to be operated together, only one graduated scale will be required for the two of them.

The foregoing procedure completes the initial adjustments of the system. There remain only the adjustments of the four coupling potentiometers 36, 62, 68 and 74. The potentiometers 42, 44, 46 and 52 having the graduated and calibrated scales, are adapted to be adjusted from time to time to alter the temperatures to which the system controls.

*Room temperature control*

As is explained in my copending application, Serial No. 189,545 already referred to, one incidental effect of the rebalancing function of the valve potentiometer 28 is to lower the temperature at which the system tends to maintain the room air as the rate of heat input increases. Obviously the rate of heat input increases with valve opening. As the valve opens the tap 29 moves to the left as seen in Fig. 2 and so makes the tap 29 more positive in potential. A part of this increased potential is imposed upon the lower terminal 15 of the galvanometer, the specific proportion being determined by the setting of the tap 37 of the coupling potentiometer 36. Accordingly with the valve partially open, the bridge tends to balance (galvanometer 16 reads zero) for a somewhat lower room temperature as measured by the resistance thermometer 50, because the falling room temperature moves the potential of the tap 57 toward the positive. However, since the upper terminal 17 of the galvanometer is not connected directly to the tap 53 but rather to the center tap 75 of the coupling potentiometer 74, the particular room temperature required to bring the bridge to balance depends partly upon the temperature of the window thermometer 40, and the window thermometer will have its maximum effect when the tap 75 is moved to its extreme upper position as seen in Fig. 2 (extreme clockwise position is seen in Fig. 1).

The best setting of the tap 37 of the potentiometer 36 is that setting at which tap 37 is moved down as seen in Fig. 2 only far enough to just prevent objectionable fluctuations of room temperature, when the system is controlled according to room temperature alone. With the potentiometer 36 at its best setting as just defined, potentiometer 74 should be so set that the control point remains substantially constant for all weather conditions, that is so that the system tends to maintain the room at the same temperature for all weather conditions.

The adjustment of center tap 37 of potentiometer 36 can best be made when the outdoor temperature is well below the room control point, as for example, when the outdoor temperature is low enough to require at least 30 percent of the maximum opening of the steam valve 12. During this test the position occupied by center tap 75 of coupling potentiometer 74 is not particularly important, but preferably should be moved to its lowermost position as seen in Fig. 2 (extreme clockwise position as seen in Fig. 1) so that the outdoor temperature as measured by window thermometer 40 will have substantially on effect on the operation of the system. The system is put into operation with the adjustable tap 37 of coupling potentiometer 36 set to its uppermost position as seen in Fig. 2 (extreme counterclockwise position as seen in Fig. 1) so that the valve potentiometer 28 will have little or no effect on the control of the valve operation. While the system as so set, will tend to maintain constant temperature of the room air, the control will hunt and the room temperature will fluctuate badly. While the system is operating, the adjustable tap 37 is gradually moved down as seen in Fig. 2, so as to increase gradually the rebalancing effect of the valve potentiometer 28 upon the bridge circuit. This adjustment of coupling potentiometer 36 is made in small steps over a considerable period of time, and its tap 37 is moved down as seen in Fig. 2 only far enough to reduce the fluctuation of the room temperature to an unobjectionable value while the outdoor temperature, and therefore the heating load, remains substantially constant. During this adjustment of the potentiometer 37, the system need not necessarily have controlled the room temperature at the most comfortable value.

The correct adjustment of the potentiometer 74 depends in part on the question of comfort in the space to be heated. Accordingly the potentiometer 52, which selects the room temperature control point, is set to that position of its calibrated scale 86 which indicates the desired room temperature for mild weather conditions (requiring light heating load). Then the system is put into operation under a substantial heating load with the potentiometer tap 75, at the beginning of the test, still in its lowermost position as seen in Fig. 2. While the system is operating, the tap 75 is moved far enough up as seen in Fig. 2 (turned far enough counter-clockwise as seen in Fig. 1) to make the system hold the room at the desired temperature. This temperature at which the system holds the room under conditions of substantial heating load need not be the same as that indicated by the setting of the control-point-selecting-potentiometer 53 on its calibrated scale 86, but may be higher or lower than that value. The scale 86 indicates only the "nominal" control point. The influences of the window thermometer 40 and the rebalancing potentiometer 36 permit the actual control point to deviate from that "nominal" value except under mild weather conditions when the heating load is slight.

Figure 3:
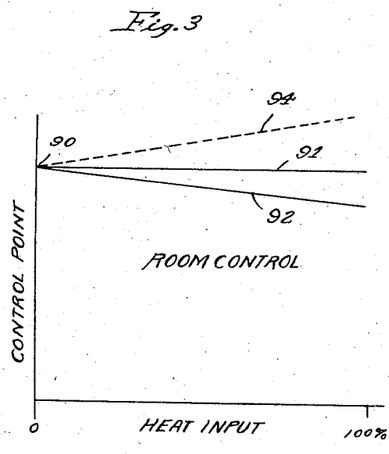
Figs. 3 and 4 are graphs illustrating the operation of the system of Figs. 1 and 2.

The separate effects of the settings of potentiometers 36 and 74 may be best illustrated by the graph of Fig. 3. In Fig. 3, the control point or temperature at which the system tends to maintain the room is plotted as ordinates against the rate of heat input as abscissa. As previously explained one effect of the rebalancing type of control is the lowering of the control point as the rate of heat input increases. This condition is represented by the drooping curve 92. The angle at which this line 92 dips down is determined by the setting of valve coupling potentiometer 36, and the dip of the curve increases as the center tap 37 of potentiometer 36 is moved down as seen in Fig. 2 to increase the effect of the valve potentiometer 28 on the galvanometer. The point 90 in Fig. 3 at which the curve 92 intersects the axis of zero heat input is determined substantially by the adjustment of potentiometer 52. In general, the two potentiometers 52 and 42 should be set to indicate the same temperature on their graduated scales. While outdoor temperature is not plotted as such on the curve of Fig. 3, the outdoor temperature, generally determines the required rate of heat input which appears as the independent variable in the graph of Fig. 3, and therefore insofar as the quantitative relations indicated in Fig. 3 are concerned, it may be assumed for the time being that outdoor temperature and rate of heat input vary together. Inasmuch as the potential of terminal 17 of galvanometer 16 is determined not only by the setting of potentiometer 52 but also by the setting of potentiometer 42, that potential in turn is determined in part by the outdoor temperature. The effect of outdoor temperature on the galvanometer raises the curve 92 in Fig. 3 to a position such as 94 as shown in dotted line, in which position the curve still intersects the axis of zero heat input at the point 90. The angle through which this control point curve is raised by the outdoor temperature as measured by the window thermometer 40 is determined by the setting of coupling potentiometer 74, the effect of outdoor temperature being greatest when center tap 75 is moved to its uppermost position as seen in Fig. 2.

*Limit control*

Figure 4:
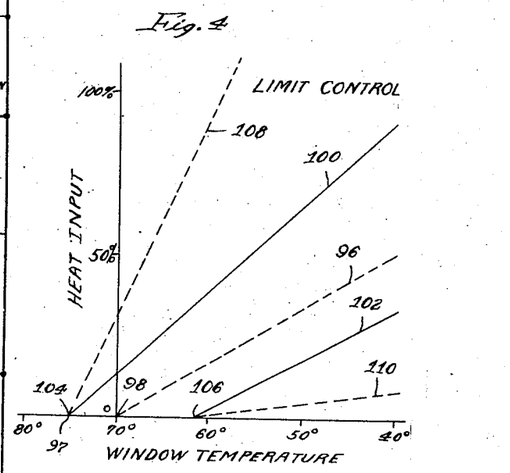

In Fig. 4, the rate of heat input is plotted as ordinates against the difference between the room control point and outdoor temperature as abscissa. The point of origin of the axes is taken at zero heat input and zero temperature difference. The axis of abscissas is marked off in values of temperature of the window thermometer 40, which values decrease towards the right with the 70 degree mark at the origin to correspond to a room control point of 70 degrees. The curve 96 represents approximately the required variation in heat input to one particular building with changes in window temperature for a control point of 70° F. Since the room is controlled to remain at 70° the heat input goes to zero and the window thermometer goes to 70° when the outdoor temperature reaches 70°, and accordingly the curve 96 intersects the axis of abscissas at the point 98 at the window temperature of 70°. This intercept 98 is determined by the same adjustment as determines the intercept 90 of Fig. 3, namely the adjustment of the two potentiometers 42 and 52. The slope of the curve 96, that is the rate at which the heat demand increases with a fall of outdoor temperature, depends principally upon the characteristics of the building being controlled but depends also to some extent upon the droop or rise of the curve 92 in Fig. 3, since for example if the room control point falls with a drop in outdoor temperature the fall of the control point represents a reduction in the difference between inside and outside temperature and consequently causes the curve 96 in Fig. 4 to rise less steeply.

It is desirable that the rate of heat input be subjected to maximum and minimum limits as represented by the two limit curves 100 and 102 in Fig. 4. Obviously the upper limit curve 100 should lie wholly above the nominal requirement curve 96 and the lower limit curve 102 should lie wholly below the curve 96. The difference between the maximum and minimum limits permits the room to regulate the rate of heat input within those limits, and so to accommodate such variations in heat demand as may be caused by changes in the wind or solar conditions or the opening of windows or the like. The point of intercept 104 of the upper limit curve 100 with the outdoor temperature axis 97 corresponds to the setting of the calibrated potentiometer 82 of Figs. 1 and 2. Similarly the intercept 106 of the lower limit curve 102 corresponds to the setting of the calibrated potentiometer 46 of Figs. 1 and 2. The slopes of the two limit curves 100 and 102 are determined by the setting of the coupling potentiometers 62 and 68 respectively. The system initially should be put into operation with the center tap 63 of coupling potentiometer 62 set to its uppermost position as seen in Fig. 2 (its extreme counter-clockwise position as seen in Fig. 1), and with the center tap 69 of coupling potentiometer 68 set to its lowermost position as seen in Fig. 2 (extreme clockwise position as seen in Fig. 1). These settings will give the upper limit curve 100 its maximum slope to make it take a position such as 108, and give the lower limit curve 102 its minimum slope to make it take a position such as 110. The system when so adjusted and put into operation will control solely in accordance with room temperature as measured by the room thermometer 50 and as corrected by the window thermometer 40 for preventing the suppression of the control point. Then with the outdoor temperature holding substantially constant for a few hours the system is permitted to operate until it holds the room temperature steady and the valve 12 experiences only occasional slight adjustments. The system as so controlled by the room temperature measurement will be steady as a result of the rebalancing action of valve potentiometer 28 because the potentiometer 36, which regulates the extent or amount of this rebalancing action, has already been brought to its proper adjustment. The control system will then have brought the rate of heat input to the proper value for the outdoor temperature then prevailing and presumably the values of window temperature and rate of heat input will correspond to some point on the nominal requirement curve 96 in Fig. 4. The motor 18 is stopped in the position in which cam 65 holds the switches 64 and 66 closed to connect the upper limit bridge system to the galvanometer 16. The calibrated potentiometer 44 is set to the same temperature reading as the potentiometer 42, to bring the intercept 104 in the diagram of Fig. 4 in to coincidence with the intercept 98. Then the potentiometer 62 is adjusted to bring the galvanometer to zero to rotate the curve 108 about the coinciding intercepts 98 and 104 and make it coincide with the curve 96. In this position the upper limit curve 100 has a known orientation and location with respect to the curve 96 and so may easily be moved therefrom to its correct position. Next the potentiometer 44 is adjusted to a temperature setting above that of the potentiometer 42, as for example 5° above, to separate the intercept 104 from the intercept 98 as shown in Fig. 4 and the center tap 63 of potentiometer 62 is moved slightly upwards as seen in Fig. 2 (counter-clockwise as seen in Fig. 1) to make the curve 100 diverge slightly from the curve 96.

Similarly the motor 18 is next stopped in the position in which cam 71 closes switches 70 and 72, the potentiometer 46 set to correspond to the setting of potentiometer 42 and the potentiometer 68 adjusted to bring the galvanometer to zero to make the lower limit curve 102 coincide with the curve 96. Then the potentiometer 46 is set to a value a few degrees below the setting of the potentiometer 42, and the arm 69 of the potentiometer 68 moved down slightly as seen in Fig. 2 to make the curve 102 lie below the curve 96 and to diverge therefrom.

A coupling potentiometer, such as the potentiometer 62, bridged between the two center points of a pair of bridge branches, such as the window thermometer branch and the radiator thermometer branch provides an extremely reliable and wide range of adjustment of the relative effects of those two bridge branches upon the galvanometer. For example, an adjustment of the slope of the curve 100 by means of the coupling potentiometer 62 can have no effect whatsoever upon the position of the intercept 104 of that same curve, because the position of the intercept is determined entirely by the setting of the potentiometer 44. The range of adjustment of the slope is determined entirely by the relative values of the total resistance of coupling potentiometer 62 and the resistances of the two bridge branches between which it is connected. A high value of resistance for the potentiometer 62 provides the greatest range of adjustment of the slope of the curve.

The arrangement of switches 64, 70 and 76 whereby only one of the coupling potentiometers 62, 68 and 74 is connected between the center points of its respective bridge branches at a time prevents the adjustment of the slope or intercept of any one curve from having any effect whatsoever upon the slope or intercept of any other curve. Furthermore any number of control functions may be performed with only one set of thermometers or other control devices, such as for example the valve potentiometer 28 or window thermometer 40 (which may be required to be located remotely from the main portion of the apparatus). Furthermore the present arrangement, while permitting all functions and measurements to be accomplished with one set of thermometer elements, does not require that the bridge branches containing those thermometers etc. be opened and closed by switch contacts. Obviously switch resistance introduced in series with the galvanometer 16 itself, as at the contact 78, can not disturb the bridge balance but can only slightly reduce the sensitivity of the galvanometer 16 to any unbalanced condition of the bridge circuit. While resistance introduced in series with the coupling potentiometer itself, as for example at the contacts 64 will disturb to some extent the balanced condition of the bridge circuit, the several contacts 64, 70 and 76 are so arranged in the circuit with respect to the functions which they control that the operation of the system will not be disturbed materially by high resistances appearing occasionally between those contacts as a result of dirt or the like between the contacting surfaces. Thus, for example if the contacts 64 should fail entirely to close, the upper limit curve 100 (in Fig. 4) would move away from the nominal curve 96 and assume a vertical position through the intercept 104, and consequently would simply fail to impose the high limit of heat input upon the operation of the system. An occasional failure of this type can cause no serious mis-operation of the system. Similarly if the contacts 70 should fail to close, they would simply leave the potential of the center arm 69 of the coupling potentiometer 68 unaffected by the window thermometer and accordingly would rotate the lower limit curve 102 about the intercept 106 away from the nominal curve 96 into a horizontal position where it would coincide with the axis of ordinates. Accordingly an occasional failure of the switch contacts 70 simply causes the system to fail to impose the lower limit of heat input and consequently can not induce any serious misoperation of the apparatus. A failure of the contacts 76 to close would leave the room temperature unaffected by the window thermometer and would cause the system temporarily to tend to control the room temperature in accordance with the curve 92 of Fig. 3 wherein the control point is depressed by the operation of the rebalancing valve potentiometer 28. But an occasional and temporary disturbance of this kind could not seriously interfere with the control operations of the system. Ordinarily there are only a few degrees difference between the correct control point on curve 94 of Fig. 3 and the corresponding point of curve 92. Those few degrees represent the maximum error, and that error could occur only when the switch contacts would fail to close at all. A "dirty" or "high resistance" engagement of the switch contacts would introduce an error less than that maximum. Furthermore the inherent time lag of the "room control" would not permit such a small error to introduce any appreciable mis-control unless the contact trouble should persist through succesive switch operations over a long period of time. Any detrimental effects of variable contact resistance of switches 64, 76 and 70 in the coupling branches are minimized by making the resistance of each coupling branch high compared to the probable range of variation of the switch contact resistance, and high compared to the resistance change that the main bridge arms (of which there are two in each main bridge branch) experience during the operation of the system.

Figure 5:
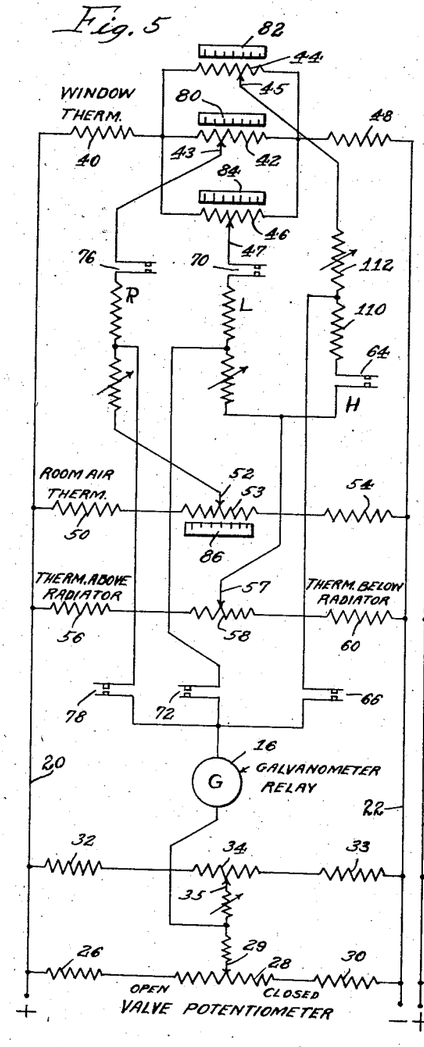
Fig. 5 is a fragmentary diagram similar to the diagram of Fig. 2 illustrating a modification of the system of Figs. 1 and 2; and, Fig. 6 is a circuit diagram similar to the diagram of Fig. 2 illustrating still another modification of the system of Figs. 1 and 2.

Fig. 5 illustrates a modification of a portion of the system of Figs. 1 and 2 wherein the coupling potentiometer is replaced by two resistors 110 and 112 connected in series, of which resistor 112 is variable. The connection to the galvanometer 16 through the switch 66 is taken off at the point between these two resistors 110 and 112. Inasmuch as the slope of the upper limit curve 100 of Fig. 4 ordinarily will not be carried below the curve 96, the full range of adjustment provided by the potentiometer 63 of Figs. 1 and 2 is not required and accordingly the range of adjustment may be restricted as shown in Fig. 5. Similarly pairs of series resistors, of which one resistor of each pair is variable also may be substituted for the potentiometers 68 and 74 of Figs. 1 and 2. Thus, while the arrangement of the coupling branches as in Fig. 5 does not provide as wide a range of adjustment as does the arrangement of Figs. 1 and 2, it does provide a more sensitive adjustment in the range that it does cover.

Figure 6:
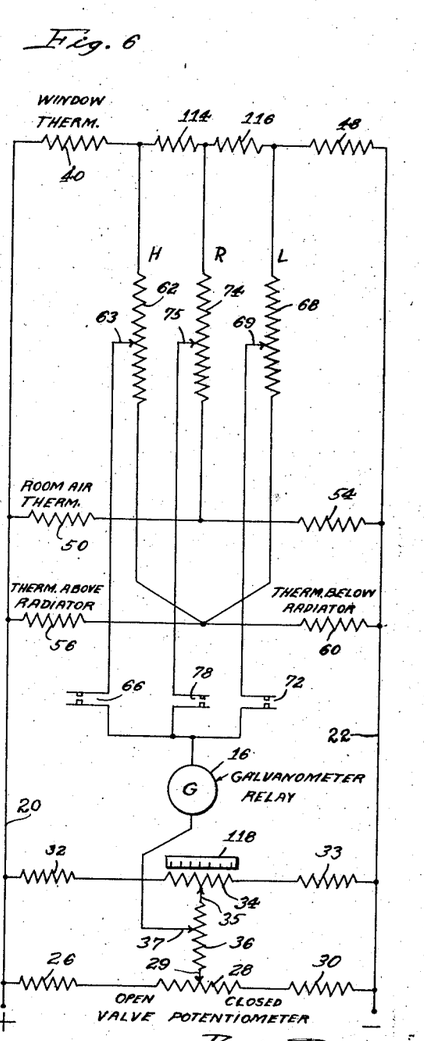

In the modification of Fig. 6 the several adjustments provided by the potentiometers 42, 44 and 46 in Fig. 1 are eliminated. The window thermometer 40 is connected in series with three resistors 114, 116 and 48. The resistors 114 and 116 have just sufficient resistance to separate the connections to the several coupling potentiometers 62, 74 and 68 by intervals corresponding to intervals of 10 degrees Fahrenheit of outdoor temperature as measured by the window thermometer 40. Accordingly the temperature intervals between the limit curves are determined by the resistors 114 and 116 and are not adjustable. In addition the centering and adjusting potentiometers 52 and 58 are eliminated and instead the centering potentiometer 34 is provided with a graduated scale 118 which is adjustable for purposes of calibrating the system. Consequently the bridge system of Fig. 6 makes no provision for initially bringing all bridge branches to perfect balance under conditions of zero heat input. In addition the system of Fig. 6 elminates the switches 64, 70 and 76 in series with coupling potentiometers 62, 74 and 68. The only initial or calibrating adjustment provided in the whole system is the adjustment of the position of the graduated scale 118 for the potentiometer 34. In the system of Fig. 6 the potentiometer 34 serves as the adjustment for selecting the control point at which the system tends to maintain the room temperature.

The initial adjustment of the system of Fig. 6 is made as follows: Switch 72 is closed and switches 66 and 78 are opened to connect the galvanometer 16 to the potentiometer 68 for measuring room temperature. The radiator thermometers 56 and 60 are brought to the same temperature. The window thermometer 40 and room thermometer 50 are brought to the same temperature near 70° F., and their temperature measured. Then with the steam valve completely closed so that the valve potentiometer 28 is in the position corresponding to zero heat input, and with the center tap 37 of potentiometer 36 moved to its uppermost position as viewed in Fig. 6 so that the potentiometer 34 will have its maximum effect upon the galvanometer 16, the potentiometer 34 is adjusted to bring the galvanometer deflection to zero, that is to balance the system. Graduated scale 118 is adjusted so that center tap 35 of potentiometer 34 indicates the measured temperature of the room and window thermometers 40 and 50. Potentiometer 34 is set to indicate the desired room temperature and the apparatus is put into operation with the center tap 63 of potentiometer 62 and center tap 37 of potentiometer 36 in their uppermost positions and with the center taps 75 and 69 of the potentiometers 74 and 78 in their lowermost positions so that the heat input will be controlled primarily in accordance with room temperature. The center tap 37 of potentiometer 36 should be moved upward just far enough to overcome objectionable fluctuations of room temperature. Next the tap 75 of potentiometer 74 is adjusted upward just enough to provide a sufficiently high control point with the outdoor temperature considerably below the control point of the room. Next the switch operating mechanism is stopped with the switch 66 closed and switches 72 and 78 open. The center tap 63 of potentiometer 62 is moved down until the galvanometer comes to zero and then is moved slightly upward to space the upper limit of heat input somewhat above the average heat requirement. Next the switch 78 is closed and with the switches 66 and 72 open the center tap 69 of the potentiometer 68 is moved up till the galvanometer comes to its zero or rest position, and then the center tap 69 is moved down slightly to space the lower limit of heat input slightly below the average heat requirement.

The selection of the control point or temperature at which the system tends to maintain the rooms of the building is made by adjusting the potentiometer 34 in accordance with its graduated and calibrated scale 118.

The system of Fig. 6 is simpler in construction and initial adjustment than that of Figs. 1 and 2 because it eliminates many of the adjustable elements of the system of Figs. 1 and 2. In many cases the simplified system is to be preferred because the absence of manually adjustable elements prevents persons unacquainted with the purposes of the several adjustments from inadvertently disturbing the settings. However, it is desirable in certain instances to provide the extreme flexibility that the numerous adjustments give the system of Figs. 1 and 2.

It will be apparent that the specific embodiments of the present invention herein illustrated and described are offered merely as illustrations and examples, and that the invention is capable of numerous modifications and variations. For example, the system may be applied to other types of heat interchange systems, such as refrigerating systems, and also may be applied to the measurement and control of conditions other than temperature. The invention is not limited in all respects to bridge circuits of the direct type or of the resistance type, nor to the use of D'Arsonval galvanometers, and wherever the term "galvanometer" appears in the claims it shall be construed to include all types of instruments responsive to the flow of electric current or to the presence of electric potential. Neither is the invention limited to resistors and the like that change their inherent impedance with temperature, but it may employ mechanically adjustable impedance devices operated by thermally responsive actuators and the like.

Accordingly the invention is to be limited only in accordance with the scope of the appended claims.

I claim:

1. In combination in an electrical measuring system, an electric measuring bridge circuit comprising two main bridge branches connected in parallel, each of said two main bridge branches including condition responsive current controlling element therein, each said main bridge branch having an output point intermediate its ends, an impedance coupling branch connected between said output points of said main bridge branches, said coupling branch having an adjustable potentiometer, the adjustable tap of which constitutes an adjustable output point for said coupling branch intermediate the points of connection of said coupling branch to the output points of said two main bridge branches, and an output connection to said output point of said coupling branch, whereby said potentiometer may be adjusted for varying the relative values of impedance between the output point of said coupling branch and the respective output points of said main bridge branches.

2. In combination in an electrical measuring system, a bridge circuit comprising three main bridge branches connected substantially in parallel, a condition responsive current controlling element in one of said main bridge branches, said main bridge branches having output points intermediate the ends thereof, two impedance coupling branches each connected to output points of two main bridge branches, said one main bridge branch having both said coupling branches connected to it, each coupling branch having a separate output point intermediate the points of its connection to the output points of its two main bridge branches, and output connections to the output points of said coupling branches.

3. In combination in an electrical measuring and control system, an electrical measuring bridge circuit including two main bridge branches connected in parallel, a current controlling element in one of said main bridge branches responsive to a first condition, a current controlling element in the second main bridge branch responsive to a second condition, an impedance coupling branch connected to said main bridge branches at points thereof intermediate the ends thereof, an output connection to said coupling branch at an output point intermediate the points of connection of said coupling branch to said two main bridge branches, a galvanometer in said output connection, regulating means responsive to said galvanometer for regulating at least one of said two conditions to vary a relation between said two conditions, but operable to vary said relation in only one direction of change, contacts for opening the circuit through said coupling branch, said contacts being so located in said coupling branch with respect to the point of connection of said galvanometer to said coupling branch and the points of connection of said coupling branch to said two main bridge branches that if said contacts should fail to close and an error should result therefrom in the response of said galvanometer to said two current controlling elements in said main bridge branches, such error would be in such a direction as to indicate to said galvanometer an error in the value of said relation between said two conditions which error in said relation would be in that direction in which the galvanometer could not tend to counteract the error.

4. In combination in an electrical measuring and control system, a system of electric bridge circuits including two main bridge branches in parallel, first and second current controlling elements connected in said main bridge branches respectively and responsive to a first and second condition respectively, an impedance coupling branch between said two main bridge branches, an output connection to said coupling branch at an output point thereof so located that there are unequal impedances between the output point of said coupling branch and the points of connection of said coupling branch to said two main bridge branches, whereby the potential of the output point of said coupling branch is more responsive to changes of said first condition than to changes of said second condition, and electric switch contacts in said coupling branch for opening the circuit therethrough, said switch contacts being located only between the output point of said coupling branch and the point of connection of said coupling branch to said second main bridge branch.

5. In combination in an electrical measuring and control system, a system of electric bridge circuits including two main bridge branches connected substantially in parallel, a condition responsive current controlling element in one of said main bridge branches, an impedance coupling branch connected between said two main bridge branches, a terminal connection to said coupling branch at a terminal point thereof so located that there are unequal impedances in the two portions between the terminal point of said coupling branch and the points of connection of said coupling branch to said two main bridge branches, and electric switch contacts in said coupling branch for opening the circuit therethrough, said switch contacts being located in said coupling branch only to that side of said terminal point thereof on which lies the greater impedance of said coupling branch.

6. In combination in an electrical measuring control system, an electrical measuring bridge circuit including two main bridge branches connected substantially in parallel whose points of connection to each other constitute terminal points, a current controlling element in one of said main bridge branches electrically responsive to a controlled condition, an impedance coupling branch connected to said main bridge branches at points intermediate the ends thereof, terminal connections to said coupling branch at a terminal point thereof intermediate the points of connection of said coupling branch to said two main bridge branches, a galvanometer connected in the bridge circuit and having a connection to at least one of said terminal points and responsive thereby to said current controlling element, regulating means responsive to said galvanometer for regulating said controlled condition to vary its effect upon said current controlling element but operable to respond to said galvanometer to vary said condition in one direction of change more rapidly than in the other direction of change, contacts for opening the circuit through said coupling, said contacts being so located in said coupling branch with respect to the point of connection of said terminal connections thereto and with respect to the sense of response of said galvanometer to the changes in said controlled condition that should said contacts fail to close and an error result therefrom in the response of said galvanometer to said controlled condition, such error would be in such direction as to indicate to said galvanometer an error in said value in the direction thereof to which the regulating means responds the less rapidly to alter said controlled condition.

7. In combination in an electrical measuring system, an electrical measuring bridge circuit comprising two main bridge branches connected substantially in parallel, one of said two main bridge branches including a condition responsive current controlling element therein, each of said main bridge branches having a coupling point intermediate its ends, an impedance coupling branch connected between said coupling points of said main bridge branches, said coupling branch having a terminal point intermediate the point of connection of said coupling branch to the coupling points of said main branches, circuit connections to said terminal point of said coupling branch, and a switch in said coupling branch, the impedance of said coupling branch being high compared to the probable variation of the impedance value of said switch in its circuit closing condition.

8. The combination of claim 3, wherein said switch is located in one of the portions of said coupling branch between its terminal point and its points of connection to the two main bridge branches, and wherein the impedance of said portion of said coupling branch in which said switch is located is high compared to the probable variation of the impedance value of said switch in its circuit closing condition.

9. In combination in an electrical measuring system, a bridge circuit comprising at least two main bridge branches connected substantially in parallel, a condition responsive current controlling element in one of said main bridge branches, said main bridge branches having coupling points intermediate the ends thereof, two impedance coupling branches, each connected between a coupling point of said one main bridge branch and a coupling point of another main bridge branch, each coupling branch having a terminal point intermediate the points of its connection to its two main bridge branches, circuit connections to the terminal points of said coupling branches, means in one of said coupling branches operable for varying the relative values of impedance of its two portions between its terminal point and its two points of connection to its two main bridge branches, and a switch in said one coupling branch for opening the circuit therethrough between the two main bridge branches to which it is connected.

10. In combination in an electrical measuring system, a bridge circuit comprising at least two main bridge branches connected substantially in parallel, a condition responsive current controlling element in one of said main bridge branches, said main bridge branches having coupling points intermediate the ends thereof, two impedance coupling branches, each connected between a coupling point of said one main bridge branch and a coupling point of another main bridge branch, each coupling branch having a terminal point intermediate the points of its connection to its two main bridge branches, circuit connections to the terminal points of said coupling branches, one of said coupling branches having a total impedance which is not large compared to the impedance value of the rest of the circuits as measured between the two end points of said one coupling branch and a switch in said one coupling branch for opening the circuit therethrough between the two main bridge branches to which it is connected.

11. In combination in an electrical measuring system, a bridge circuit comprising at least two main bridge branches connected substantially in parallel, a condition responsive current controlling element in one of said main bridge branches, said main bridge branches having coupling points intermediate the ends thereof, two impedance coupling branches, each connected between a coupling point of said one main bridge branch and a coupling point of another main bridge branch, each coupling branch having a terminal point intermediate the points of its connection to its two main bridge branches, circuit connections to the terminal points of said coupling branches, one of said coupling branches including adjustable impedance means operable for changing the total impedance value of said one coupling branch, said one coupling branch including also a switch for opening the circuit therethrough between the two main bridge branches to which it is connected.

12. The combination of claim 2 wherein one of said output connections includes a switch for opening the circuit to the output point of the coupling branch to which it is connected.

13. In combination in an electrical measuring system, a bridge circuit comprising two main bridge branches connected substantially in parallel, a condition responsive current controlling element in one of said main bridge branches, said main bridge branches having coupling points intermediate the ends thereof, two impedance coupling branches each connected between coupling points of said two bridge branches, each coupling branch having a separate terminal point intermediate the points of its connection to the coupling points of said two main branches, and terminal connections to the terminal points of said coupling branches.

14. The combination of claim 13 wherein one of said two coupling branches has an impedance value which is large compared to the impedance of the rest of the bridge circuit as measured between the coupling points to which said one coupling branch is connected.

FRED W. WHITLOCK.